UNITED STATES PATENT OFFICE.

CHARLES F. BROCKMEYER, OF BENNETT, IOWA.

WHOLE-WHEAT FOOD PRODUCT.

1,374,185. Specification of Letters Patent. Patented Apr. 12, 1921.

No Drawing. Application filed November 15, 1920. Serial No. 424,158.

*To all whom it may concern:*

Be it known that I, CHARLES F. BROCKMEYER, a citizen of the United States, residing at Bennett, in the county of Cedar and State of Iowa, have invented a new and useful Whole-Wheat Food Product, of which the following is a specification.

My invention relates, in general terms, to improvements in whole wheat food products and in processes of compounding or manufacturing the same, and more particularly it is designed to provide a substantially non-perishable whole wheat cereal food wherein all of the nutritious elements or substances of the wheat are retained in the final product which may be served without first being cooked or steamed or otherwise specially prepared.

In order to clearly define the substance of my invention it is pointed out that whole wheat grain consists of three parts; the germ, the endosperm or kernel, and the bran or hull. The germ is characterized by its richness in proteids and fat, the endosperm by an abundance of starch, and the bran or hull by a preponderance of mineral matter and cellulose. Consequently, any process which would accomplish the desired results must separate and prepare each of these parts and combine the whole into a palatable and easily digestible food. Furthermore, a quantitative analysis of whole wheat grain shows that it contains about fourteen percent of proteids, a trace of sugar and cellulose, about seventy percent of starch, and approximately two percent of fat and ash respectively. The remainder, about ten percent, is water which must be evaporated as one step in a practical process to render the final product as nearly non-perishable as is possible. For the sake of differentiating my process and its product from others known in the art it is pointed out that almost all other processes either contemplate a final product which takes the form of a thin flake, or one which must be cooked, steamed or otherwise prepared before serving. Not only do the processes of manufacture of these food products differ essentially from mine, but the products *per se* are also different in that the food product formed by my process affords sufficient granular resistance to the teeth during mastication to prevent decay.

From the foregoing it will be seen that the principal objects of my invention, briefly stated, are: first, to provide a process for the manufacture of a food product which contemplates separating, preparing and re-combining the distinctive parts of whole wheat grain into a substantially non-perishable, directly edible cereal food; second, the provision of a food product *per se* having physical characteristics which offer a desirable resistance to the teeth; and third, to provide a cereal food product *per se* which may be easily digested and assimilated by a participant thereof with the maximum beneficial results.

For the purpose of illustrating the application of my present process, and the characteristics of its product, there is described hereinafter one method which is at present preferred, since the same has been found in practice to give satisfactory and reliable results, although it is to be understood that the various steps of which the process consists can be differently organized and arranged, and such variations can be made in the nature of the cereal food resultant therefrom. providing such departures from the precise disclosure fall within the spirit of the invention and the scope of the claims appended hereunto.

In order that the process will be clearly defined in the mind of one skilled in the art to which the invention appertains the following major steps or operations are outlined.

1. The whole wheat grain is passed through roller or rolling mills for the purpose of separating the hull or bran from the kernel or endosperm, and at the same time and in the same operation the kernels or endosperm are cracked and crushed. Attention is here directed to the fact that the kernels are not pulverized as in making whole wheat flour.

2. The hull or bran and the cracked kernels or endosperm are now united or mixed together as in making Graham flour and sufficient pure water is added to form a stiff batter which is tastefully seasoned with salt.

3. The batter is next placed in shallow pans which are disposed in an oven for approximately two hours, or until the whole has been thoroughly baked.

4. The baked product is now removed from the pans and broken into small pieces.

5. These small pieces are again placed in shallow pans which are disposed in an open oven to complete the process of dehydration or evaporation of moisture so that the resultant product will be substantially non-perishable. In this same process these small pieces are toasted giving a distinct palatable flavor.

6. The final step in the process contemplates grinding the small pieces until a degree of comminution is attained which will afford the desired resistance to the teeth during mastication to avoid decay which has heretofore been attributable to the continued consumption of soft-cooked foods.

It will be evident from the foregoing description that the process itself is not intricate, nor does it require the utilization of complex machinery for its adaptation, but the peculiar sequence and application of its various steps accomplishes the formation of a food product which combines all of the advantages previously specified. It is here reiterated that the resultant food product may be served as it comes from the original package without any previous preparation, and it may also be used with equal facility in all climates and as a concentrated food for use on hunting trips or the like. Furthermore, as the original wheat kernels or endosperm are not pulverized or milled as in the preparation of flour, moisture is not quickly absorbed and sealed wrappers for packages containing the same should not be necessary in any but the very dampest climates.

It is also pointed out that when it is desired to serve my cereal food to infants or invalids the same may be rendered especially assimilable by slight steaming or cooking. Ordinarily, however, the food is served with cream and sugar, and is particularly designed for consumption at the breakfast table.

Having described my process and its product with such attention to detail as will thoroughly acquaint one skilled in the art with its application and advantages, I claim:

1. The hereinbefore described process of preparing a food consisting in simultaneously separating the hulls and kernels of whole grain and crushing and cracking the kernels, uniting the hulls and cracked and crushed kernels and mixing water therewith, baking the whole, breaking up the baked product, dehydrating and toasting the same in an oven, and finally grinding the whole to form the finished product.

2. The hereinbefore described process of preparing a cereal food consisting in simultaneously separating the hulls and kernels of whole grain, and cracking and crushing the kernels, uniting the hulls and cracked and crushed kernels and mixing sufficient water therewith to form a thick batter, baking the batter in shallow pans, breaking the baked product into small pieces, dehydrating and toasting the pieces in an open oven, and finally grinding the whole to a state of comminution sufficient to afford resistance to the teeth.

In testimony whereof, I affix my signature hereto.

CHARLES F. BROCKMEYER.